(12) United States Patent
Gonsalves et al.

(10) Patent No.: US 7,590,691 B2
(45) Date of Patent: Sep. 15, 2009

(54) INDIRECT SUBSCRIPTIONS TO TOP N LISTS OF CONTENT FEEDS

(75) Inventors: Carl Laurence Gonsalves, Mountain View, CA (US); Jason H. Shellen, Pleasanton, CA (US)

(73) Assignee: Google Inc., Mountain View, CA (US)

( * ) Notice: Subject to any disclaimer, the term of this patent is extended or adjusted under 35 U.S.C. 154(b) by 224 days.

(21) Appl. No.: 11/246,656

(22) Filed: Oct. 7, 2005

(65) Prior Publication Data
US 2007/0083894 A1 Apr. 12, 2007

(51) Int. Cl.
*G06F 15/16* (2006.01)
(52) U.S. Cl. ............... 709/205; 709/204; 709/213; 709/217; 709/218; 709/224; 709/223
(58) Field of Classification Search ............ 709/204, 709/205, 213, 217, 218, 223, 224
See application file for complete search history.

(56) References Cited

U.S. PATENT DOCUMENTS

| | | | |
|---|---|---|---|
| 6,148,330 A | 11/2000 | Puri et al. | 709/217 |
| 7,246,014 B2 * | 7/2007 | Forth et al. | 702/60 |
| 7,383,266 B2 * | 6/2008 | Stewart et al. | 707/100 |
| 7,412,534 B2 * | 8/2008 | Tsang et al. | 709/231 |
| 2003/0184583 A1 | 10/2003 | Lim | 345/738 |
| 2004/0189695 A1 | 9/2004 | Kurtz et al. | 345/738 |
| 2005/0193010 A1 | 9/2005 | DeShan et al. | 707/104.1 |
| 2005/0198125 A1 * | 9/2005 | Beck et al. | 709/204 |
| 2005/0240531 A1 * | 10/2005 | Wolff, Jr. | 705/53 |
| 2006/0073812 A1 | 4/2006 | Venkata et al. | 455/412.1 |
| 2006/0112076 A1 | 5/2006 | Burris et al. | 707/3 |
| 2006/0173985 A1 | 8/2006 | Moore | 709/223 |
| 2007/0038712 A1 * | 2/2007 | Affronti et al. | 709/206 |
| 2007/0061711 A1 | 3/2007 | Bodin et al. | 715/523 |
| 2007/0083468 A1 * | 4/2007 | Wetherell | 705/51 |
| 2007/0083520 A1 * | 4/2007 | Shellen et al. | 707/10 |
| 2007/0083536 A1 * | 4/2007 | Darnell et al. | 707/101 |
| 2007/0174487 A1 * | 7/2007 | Busey | 709/246 |

(Continued)

FOREIGN PATENT DOCUMENTS

WO     WO 03/058534 A1     7/2003

(Continued)

OTHER PUBLICATIONS

International Search Report for International Application No. PCT/US2006/039265, mailed May 17, 2007.

(Continued)

*Primary Examiner*—Liangche Alex Wang
(74) *Attorney, Agent, or Firm*—Morgan, Lewis & Bockius LLP

(57) ABSTRACT

A user may subscribe to a content feed group that includes a set of content feeds. The content feed group includes a first set of content items from the set of included content feeds. The content items are presented in response to a subscription to the content feed group. After a change to a content feed group, such as an addition or a removal of a content feed from the set, a second set of content items, reflecting the changed set of content feeds, are presented.

21 Claims, 11 Drawing Sheets

U.S. PATENT DOCUMENTS

2007/0204308 A1\* 8/2007 Nicholas et al. ............... 725/86

FOREIGN PATENT DOCUMENTS

WO     WO 2005/089336     9/2005

OTHER PUBLICATIONS

Jarrett, A.C., et al. "NusEye: Designing for Social Navigation in Syndicated Content," Proceedings of the 2005 Conf. on Diversity in Computing , Albuquerque, New Mexico, Oct. 19, 2005, pp. 17-19.

Kennedy, D.M., "Beating Information Overload with News Aggregators," Law Practice Management, vol. 29, No. 8, Nov. 2003, pp. 38-42.

Paterson, C., "Feeding Time," Personal Computer World, vol. 27, No. 2, Feb. 2004, pp. 101-104.

Nottingham, N., et al., "The Atom Syndication Format," The Internet Society, http://www.ietf.org/internet-drafts/draft-ietf-atompub-format-11.txt, Aug. 15, 2005.

Daily, G., "Aggregating the Aggregators RSS Reader Round-Up," Econtent, Online, Inc., vol. 28, No. 4, Apr. 2005, pp. 38-40.

Hammersley, B., "Content Syndication with RSS," [Online] Mar. 2003, O'Reilly, USA, URL: http://safari.oreilly.com/0596003838, [retrieved on Jan. 15, 2007], Chapters 9-10.

International Search Report and Written Opinion for International application No. PCT/US2006/039566, mailed Jan. 23, 2007.

International Search Report and Written Opinion for International application No. PCT/US2006/039263, mailed Feb. 26, 2007.

International Search Report and Written Opinion for International application No. PCT/US2007/079981, mailed Feb. 20, 2008.

Office Action dated Jul. 29, 2008, for related U.S. Appl. No. 11/246,597.

Response to Final Office Action and Interview Summary filed with Request for Continued Examination, May 12, 2008 for related U.S. Appl. No. 11/246,597.

Final Office Action dated Feb. 19, 2008, for related U.S. Appl. No. 11/246,597.

Amendment in response to the Office Action dated Aug. 29, 2007, for related U.S. Appl. No. 11/246,597, filed Nov. 28, 2007.

Office Action dated Aug. 29, 2007, for related U.S. Appl. No. 11/246,597.

\* cited by examiner

INDIRECT SUBSCRIPTIONS TO TOP N LISTS OF CONTENT FEEDS

RELATED APPLICATIONS

This application is related to the following U.S. patent applications, which are incorporated by reference herein in their entirety:

U.S. patent application Ser. No. 11/246,596, titled "Personalized Content Feed Suggestions Page," filed Oct. 7, 2005;

U.S. patent application Ser. No. 11/246,657, titled "Content Feed User Interface with Gallery Display of Same-Type Items," filed Oct. 7, 2005; and U.S. patent application Ser. No. 11/246,597, titled "Indirect Subscriptions to A User's Selected Content Feed Items," filed Oct. 7, 2005.

TECHNICAL FIELD

The disclosed embodiments relate generally to content syndication, and more particularly, to providing indirect subscriptions to feed content.

BACKGROUND

Content syndication is growing in popularity as a way to distribute frequently updated information, such as news and blog postings, on the Internet. Using content syndication formats such as Really Simple Syndication (RSS), content providers can include content and/or links to such in a content feed. Users may subscribe to these content feeds using an application known as a reader or aggregator. When the content feed is updated with new content items, the new content items are reflected in the user's reader.

A passive user may wish to avoid managing her content feed subscriptions. One way is to adopt another user's content feed subscriptions as her own, thus delegating the responsibility of selecting content feeds for subscription to that another user. A second user may export his list of content feed subscriptions to a file. The first user can import the file into her aggregator application and subscribe to the content feeds included in the file. However, this still requires some subscription management on the part of the first user, since she is still responsible for unsubscribing from content feeds to which she no longer wishes to subscribe.

Accordingly, there is a need for a more efficient manner of subscribing to feed content.

SUMMARY OF EMBODIMENTS

In accordance with some embodiments, a method of subscribing to content includes subscribing a user to a content feed group that includes a set of content feeds; presenting to the user a first plurality of content items in accordance with the content feed group; and after a change to the content feed group, presenting to the user a second plurality of content items in accordance with the changed content feed group.

In accordance with some embodiments, the aforementioned operations may be performed by a system having memory, one or more processors, and one or more modules stored in the memory and configured for execution by the processors.

In accordance with some embodiments, instructions for the aforementioned operations may be included in a computer program product for use in conjunction with a computer system.

BRIEF DESCRIPTION OF THE DRAWINGS

Like reference numerals refer to corresponding parts throughout the drawings.

DESCRIPTION OF EMBODIMENTS

A content feed aggregation system may provide for indirect subscriptions. Rather than subscribing directly to content feeds (or primary feeds), a user can subscribe to a group of content items or a group of content feeds selected by another user or according to predefined criteria. The selected items or feeds are "repackaged" into a "secondary" content feed, to which the user may subscribe. The content items included in the secondary feed may change as the selection of content items or content feeds changes and the content items presented by the user as part of the subscription to the secondary feed changes along in accordance with the changed selection.

Figure 1:
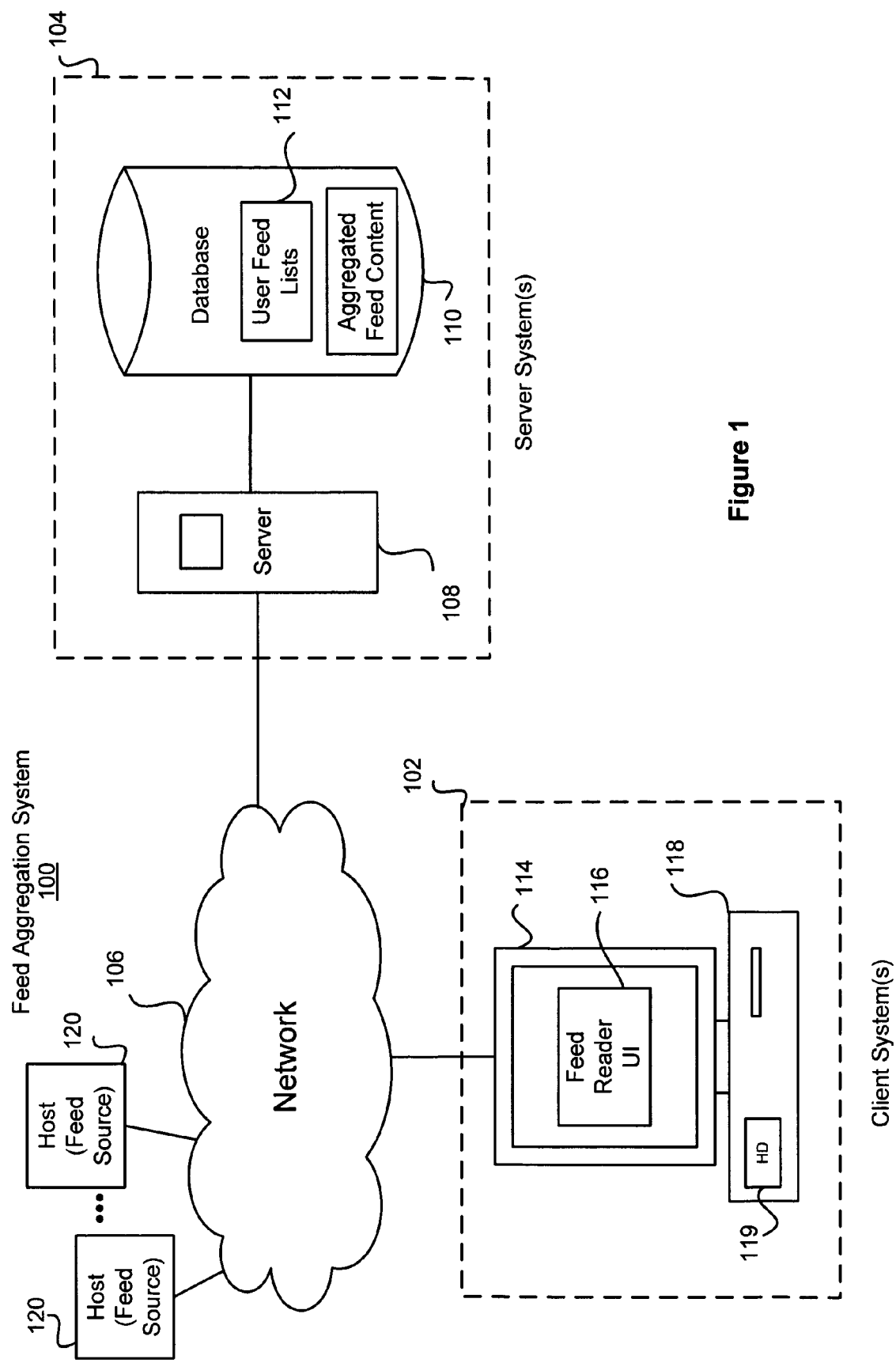
FIG. 1 is a block diagram illustrating a content feed aggregation system in accordance with some embodiments.

FIG. 1 is a block diagram illustrating a content feed aggregation system in accordance with some embodiments. The content feed aggregation system 100 includes a server system 104. The server system 104 is coupled to one or more client systems 102 and to one or more hosts 120 (or "feed sources") by a network 106. The network 106 may be any suitable wired and/or wireless network and may include a local area network (LAN), wide area network (WAN), the Internet, and so forth.

The server system 104 accesses content feeds from the feed sources 120. The server system 104 includes a server 108 and a database 110. Server 108 serves as a front-end for the server system 104. Server 108 retrieves the content feeds from the feed sources 120, and also provides an interface between the server system 104 and the client systems 102. In some embodiments, the functions of server 108 may be divided or allocated among two or more servers.

The server system 104 stores content items in the content feeds in the database 110. In some embodiments, the database 110 stores both metadata (e.g., title, description, URL, date/time, and possibly other metadata) and the content of each content item. However, in some other embodiments, the database 10 stores the metadata but not the content for each content item. The database 10 also stores user feed information 112 for a plurality of users. The user feed information for a particular user identifies content feed subscriptions, as well as sources, filters, and read states for that particular user. That is, user feed information associated with a user identifies the content feeds to which the user has subscribed, any filters the user has defined for the feeds, any labels the user has associated with individual feed items, and an indication of whether each feed item has been marked as "read" by the user.

It should be appreciated that the server system 104, including the server 108 and the database 10, may be implemented as a distributed system of multiple computers. However, for convenience of explanation, the server system 104 is described below as being implemented on a single computer, which can be considered a single logical system.

A content feed (or channel) is a resource or service that provides a list of content items that are present, recently added, or recently updated at a feed source 120. A content item in a content feed may include the content associated with the item itself (the actual content that the content item specifies), a title and/or a description of the content, a locator (e.g., URL) of the content, or any combination thereof. For example, if the content item identifies a text article, the content item may include the article itself inline, along with the title and locator. Alternatively, a content item may include the title, description and locator, but not the article content. Thus, some content items may include the content associated with those items, while others contain links to the associated content but not the full content of the items. A content item may also include additional metadata that provides additional information about the content. The full version of the content may be any machine-readable data, including but not limited to web pages, images, digital audio, digital video, Portable Document Format (PDF) documents, and so forth.

In some embodiments, a content feed is specified using a content syndication format, such as RSS. RSS is an acronym that stands for "rich site summary," "RDF site summary," or "Really Simple Syndication." "RSS" may refer to any of a family of formats based on the Extensible Markup Language (XML) for specifying a content feed and content items included in the feed. In some other embodiments, other content syndication formats, such as the Atom syndication format or the VCALENDAR calendar format, may be used to specify content feeds.

Further information regarding the RSS syndication format known as "Really Simple Syndication" is disclosed in the *RSS 2.0 Specification* by D. Winer, which is hereby incorporated by reference herein in its entirety. M. Nottingham et al. disclose further information regarding the Atom syndication format in *The Atom Syndication Format*, which is hereby incorporated by reference herein in its entirety.

A user interfaces with the server system 104 and views content items at a client system or device 102 (hereinafter called the client system for ease of reference). The client system 102 includes a computer 118 or computer controlled device, such as a personal digital assistant, cellular telephone or the like (hereinafter called the client system for ease of reference). The computer 118 typically includes one or more processors (not shown); memory, which may include volatile memory (not shown) and non-volatile memory such as a hard disk drive 119; and a display 114. The computer 118 may also have input devices such as a keyboard and a mouse (not shown).

In some embodiments, a user may interact with the server system 104 via a feed reader user interface 116 that may be presented on the display 114. The user may create a list of feed subscriptions via the feed reader user interface 116. In some embodiments, using the feed reader user interface 116, the user may also create filters or labels to be applied to content feeds and/or content items, and modify the read states of content feeds and/or content items. The feed reader user interface transmits a list of content feed subscriptions, or modifications to a list of content feed subscriptions, to the server system 104 for storage at the database 110. The feed reader user interface 116 presents content items stored at the database 110 to the user based on the user's list of content feed subscriptions. That is, feed reader user interface 116 presents to the user content items specified in the content feeds to which the user has subscribed. A user may view the full version of the content of a content item in the feed reader user interface 116 by selecting it (e.g., by clicking on it with a mouse pointer). In some embodiments, a copy of the user's list of content feed subscriptions and copies of the presented content items may be cached locally at the client system 102.

In some embodiments, the feed reader user interface 116 may be a web-based user interface. That is, the feed reader user interface 116 includes a plurality of web pages. The web pages may be written in the Hypertext Markup Language (HTML), Extensible Markup Language (XML), or any other suitable language for preparing web pages, and may include one or more scripts for interfacing with the server system 104. The user may subscribe to content feeds, view content items, and otherwise interact with the server system 104 by interacting with the web pages of the feed reader user interface 116. In other words, the server system 104, including the feed reader user interface 116, provides a web-based content aggregation service. The server system 104 aggregates and stores content items in accordance with the user's content feed subscriptions. In some embodiments, the server system 104 can also apply filters or labels, or change the read states of content items in accordance with user actions or instructions. When the user accesses the feed reader user interface 116, the content items are presented to the user via the feed reader user interface 116.

In some other embodiments, the feed reader user interface 116 may be a part of a standalone application that is run on the client system 102. The standalone application may interface with the servers system 104 via an application programming interface (API).

Figure 2:
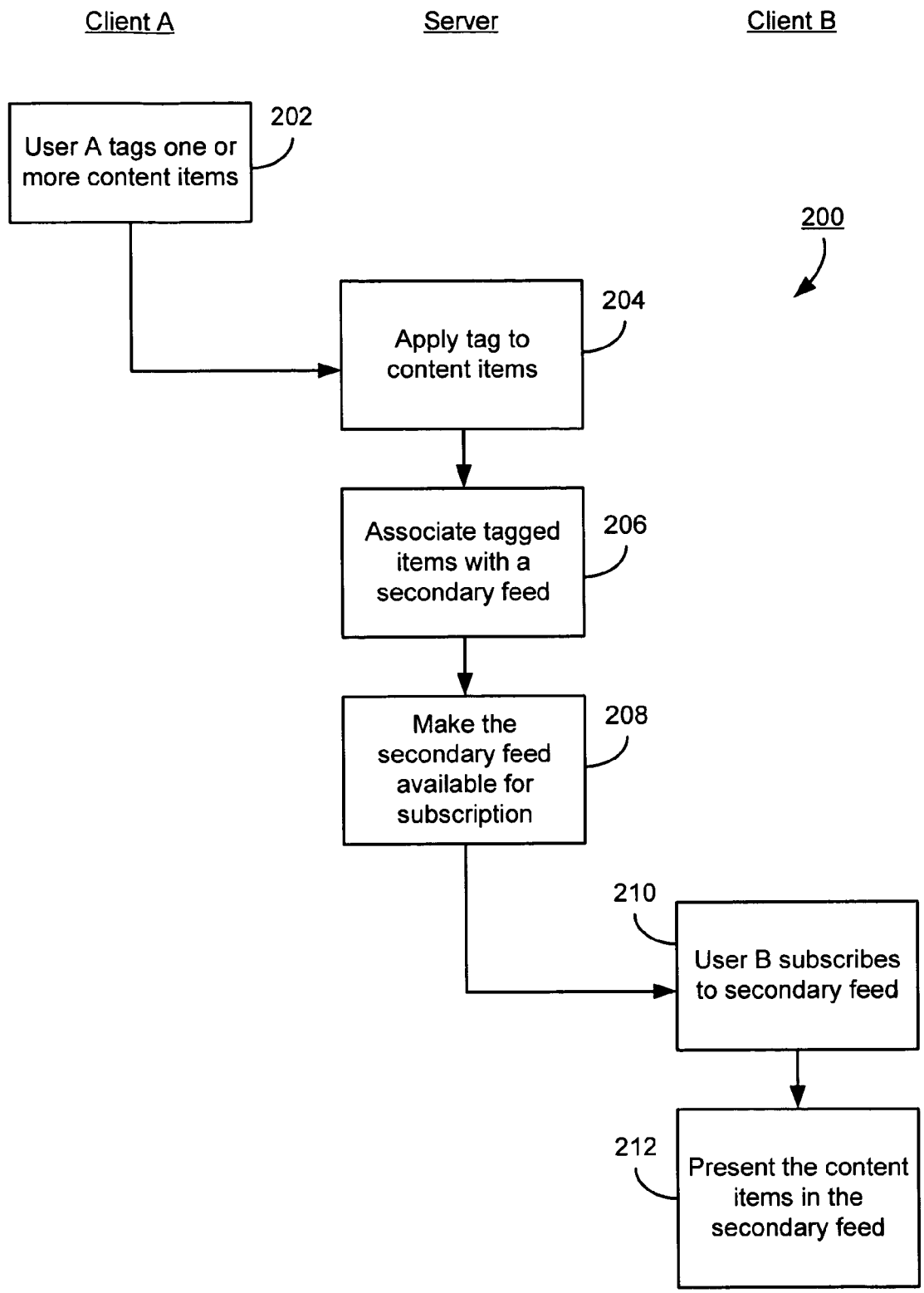
FIG. 2 is a flow diagram illustrating a process for presenting to a user content selected by another user, in accordance with some embodiments.

FIG. 2 is a flow diagram illustrating a process 200 for presenting to a user content selected by another user, in accordance with some embodiments. At a first client (hereinafter "Client A" for convenience), a first user (hereinafter "User A" for convenience) applies a tag (or "label") to one or more content items in the feed reader user interface 116 (FIG. 1) (202). The content items need not be all from the same content feed; the content items may be from any number of content feeds to which User A is subscribed. The tag may be a default tag predefined by the system or a tag created and defined by User A. In some embodiments, the user may define a filter or rule to automatically tag (or "label") items on her behalf. For example, the user may define a rule to apply a "Sports" tag to all content items with at least one of the keywords "baseball," "football," "basketball," "hockey," and "soccer."

For purposes of this description, the words "tag" and "label," whether used as a noun or as a verb, are interchangeable.

At the server, the tag is applied to the one or more content items, which are stored in the database 110 (FIG. 1), in accordance with the application of the tag to the content items by User A (204). In some embodiments, the tag is applied at the server by associating the content items with the tag in the database 110. The tagged content items are associated with a content feed that includes the tagged content items (hereafter the "secondary feed") (206). In other words, the secondary feed is a content feed generated from tagged content items. In some embodiments, the tagged content items are aggregated and listed in a content feed document written according to a content syndication format such as RSS or Atom. The content feed document is the secondary feed. In some embodiments, the secondary feed is associated with the user who applied the tag (User A in this case), as well as being associated with the tag.

The secondary feed is made available for subscription by other users (208). In some embodiments, the secondary feed is added to a list, which is accessible to other users, of available content feed subscriptions. Other users may view the list and select the secondary feed for subscription. In some embodiments, the availability of the secondary feed is limited to users selected or approved by Client A. In some embodiments, the set of users to whom the secondary feed is available may be limited, at Client A's election, to users with whom Client A has a mutual presence subscription in an instant messaging application or service.

At a second client (hereinafter "Client B" for convenience), a second user (hereinafter "User B" for convenience) subscribes to the secondary feed (210). The content items in the secondary feed (i.e., the content items tagged by User A) are presented to the user (212). In some embodiments, items already viewed by User B in the past may be hidden from the user and thus the content items actually presented may be a subset of the items in the secondary feed.

After the subscription to the secondary feed by User B, User A may choose to apply the tag to additional content items or remove the tag from one or more content items to which the tags were applied. The content items in the secondary feed are changed in accordance with the user's tagging changes. That is, the additional items tagged by User A are added to the secondary feed and the content items from which the tag was removed are removed from the secondary feed. In some embodiments, the changes to the secondary feed are also reflected in the presentation of content items to User B.

Figure 3A:
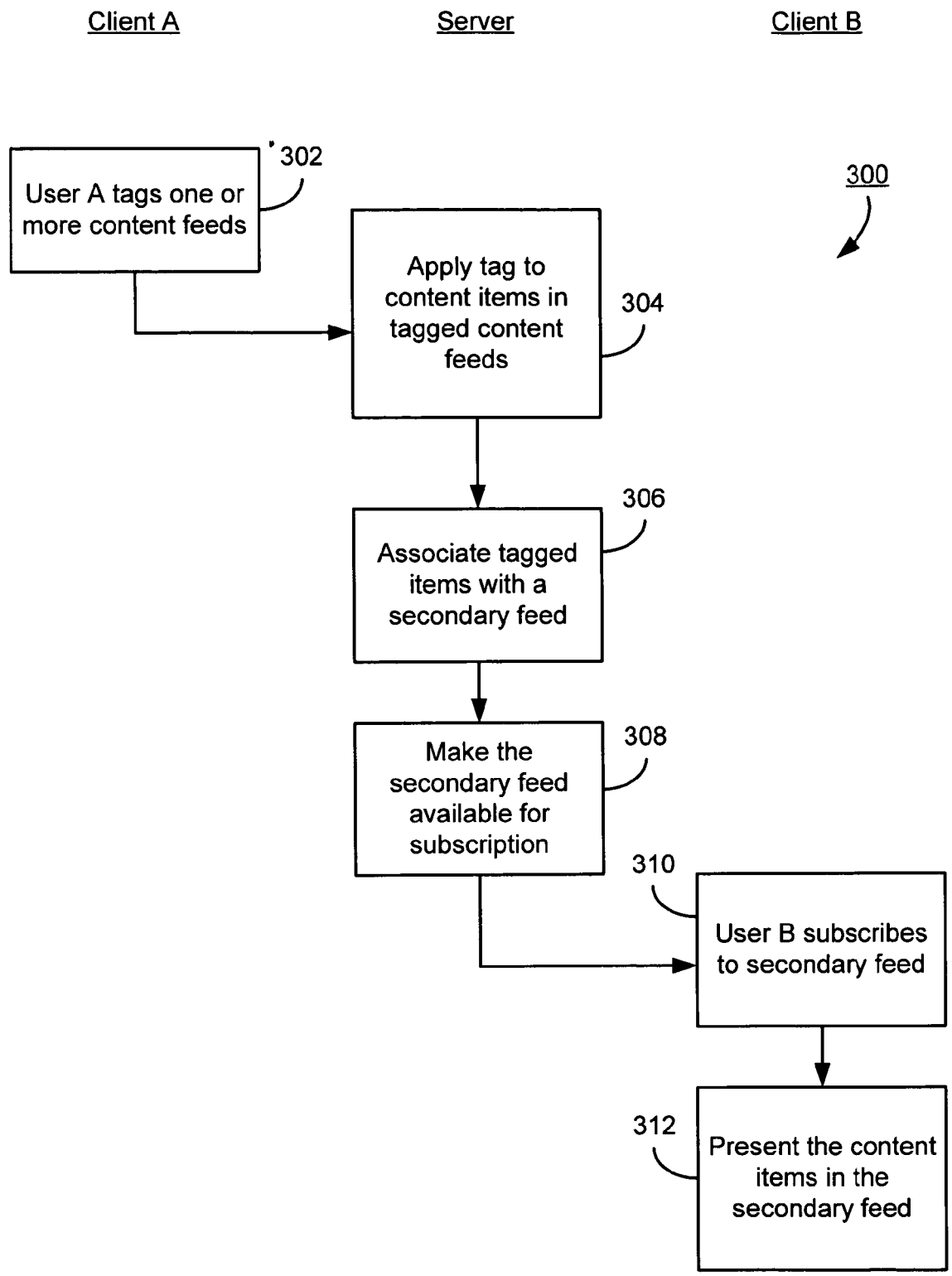
FIGS. 3A-3B are flow diagrams illustrating a process for presenting to a user content feeds selected by another user, in accordance with some embodiments.
Figure 3B:
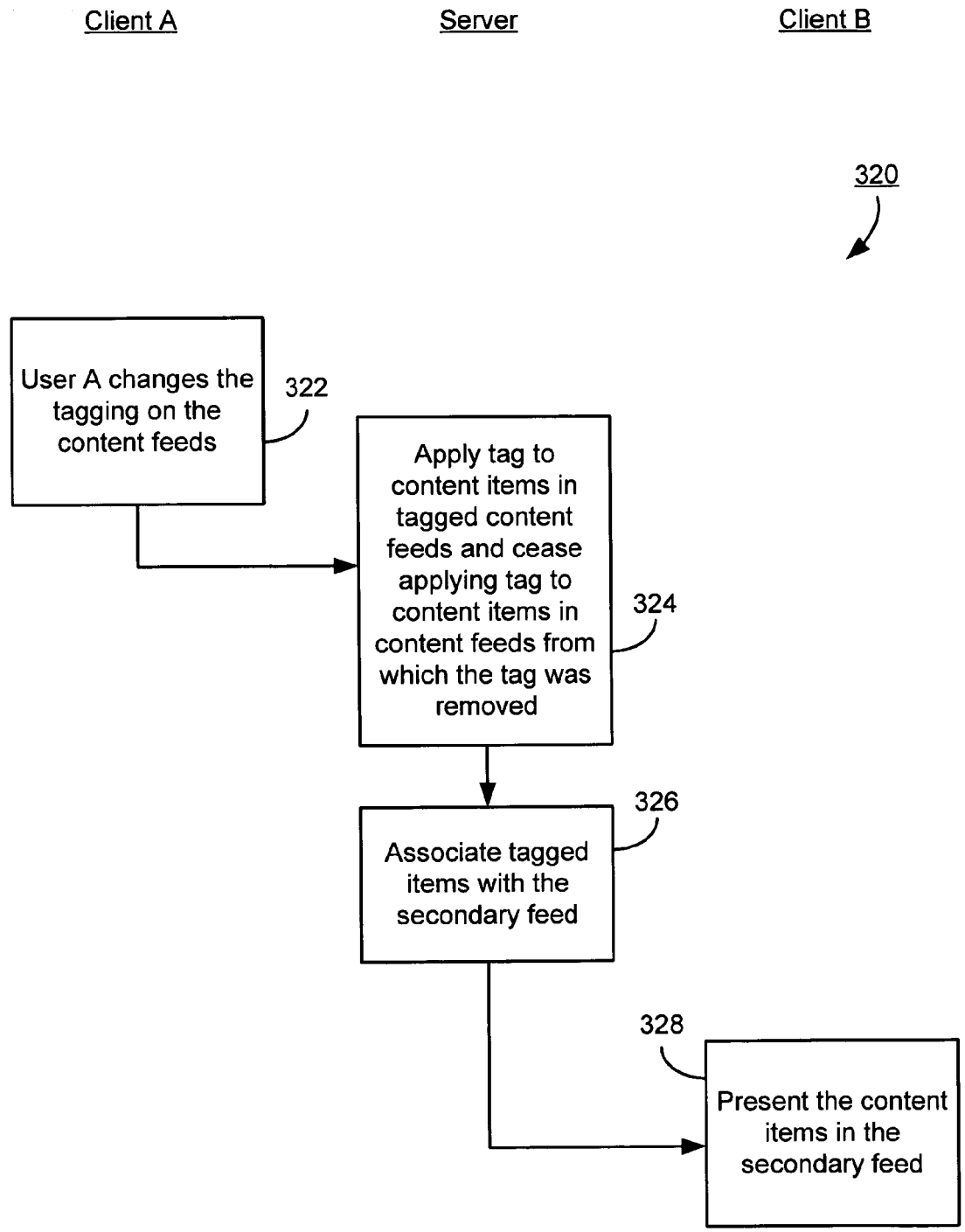

FIGS. 3A-3B are flow diagrams illustrating a process for presenting to a user content feeds selected by another user, in accordance with some embodiments. Attention is now directed to process 300 in FIG. 3A, which is similar to process 200 in FIG. 2. At Client A, User A applies a tag (or "label") to one or more content feeds to which User A is subscribed in the feed reader user interface 116 (FIG. 1) (302). The tag may be a default tag predefined by the system or a tag created and defined by User A. Application of the tag to the content feeds creates, at least conceptually, a content feed group that includes a set of one or more content feeds. The content feed group is herein called a secondary feed.

At the server, the tag is applied to content items in the set of content feeds tagged by the user, in accordance with the application of the tag to the content feeds by User A (304). In some embodiments, the tag is applied at the server by associating the content items with the tag in the database 110. The tagged content items are associated with a secondary feed (306), similar to operation 206 (FIG. 2). In some embodiments, the tagged content items are aggregated and listed in a content feed document written according to a content syndication format such as RSS or Atom. The content feed document is the secondary feed. The secondary feed represents the content feed group; the secondary feed includes the content items included in the content feeds that belong to the content feed group. In some embodiments, the secondary feed is associated with the user who applied the tag (User A in this case), as well as being associated with the tag.

The secondary feed is made available for subscription by other users (308). In some embodiments, the secondary feed is added to a list, which is accessible to other users, of available content feed subscriptions. Other users may view the list and select the secondary feed for subscription. In some embodiments, as in process 200 (FIG. 2), the availability of the secondary feed is limited to users selected or approved by Client A. In some embodiments, the set of users to whom the secondary feed is available may be limited, at Client A's election, to users with whom Client A has a mutual presence subscription in an instant messaging application or service.

At Client B, User B subscribes to the secondary feed (310). User B, by subscribing to the secondary feed, subscribes to the content feed group represented by the secondary feed. The content items in the secondary feed (i.e., the content items in the content feeds tagged by User A and belonging to the content feed group) are presented to the user (312). In some embodiments, items already viewed by User B in the past may be omitted and thus the content items actually presented may be a subset of the items in the tagged content feed.

Attention is now directed to FIG. 3B, which illustrates a process 320 of presenting to a user a changed selection of content feeds. After the process 300, User A may apply the same tag to additional content feeds and/or remove the tag from one or more content feeds to which the tag has been applied. The content items presented to User B may change in accordance to the tagging changes made by User. A.

User A changes the tagging on the content feeds (322). User A applies the same tag to additional content feeds and/or removes the tag from one or more content feeds to which the tag has been applied. This changes the content feed group by adding and removing content feeds from the set of content feeds included in the content feed group.

At the server, the tagging of the content items is changed in accordance with the tagging changes made by User A (324). The content items that are tagged are associated with the secondary feed (326), as in operation 306 (FIG. 3A). The tag is applied to content items in the additional content feeds that were newly tagged by User A. In some embodiments, the tag is applied only to content items, in the additional content feeds, dated after the application of the tag to the additional content feeds. In other words, only content items from the additional content feeds dated after the secondary feed update are added to the secondary feed. In some other embodiments, the tag is applied to all of the content items in the additional content feeds. That is, all of the content items in the newly tagged content feeds are added to the secondary feed.

For the content feeds from which the tag was removed, in some embodiments, content items dated after the removal of the tag from the content feeds are not tagged. In other words, the tag is not applied to content items in a content feed from which the tag was removed, as of the time of the removal of the tag from the content feed. Thus, while content items dated after the content feed was removed from the content feed group are not included in the secondary feed, items dated before the removal may remain in the secondary feed. In some other embodiments, the tag is removed from all of the content items in the content feed from which the tag was removed. As a result, all of the content items in the removed content feed are removed from the secondary feed.

The content items in the secondary feed are presented to User B (328), assuming that the subscription to the tagged content feed is still active since the process 300 The presented content items include content items added to the secondary feed as a result of adding a content feed to the content feed group and may exclude content items removed from the secondary feed as a result of removing a content feed from the content feed group. As described above, content items read by the user may be omitted from the presentation.

While the processes 200, 300, and 320 are described as involving two users on distinct clients, it should be appreciated that the processes described above may involve two or more users using a multi-user computer, such as a computer that has user accounts and profiles for each user of the computer, but using the content aggregation service at different times.

Figure 4:
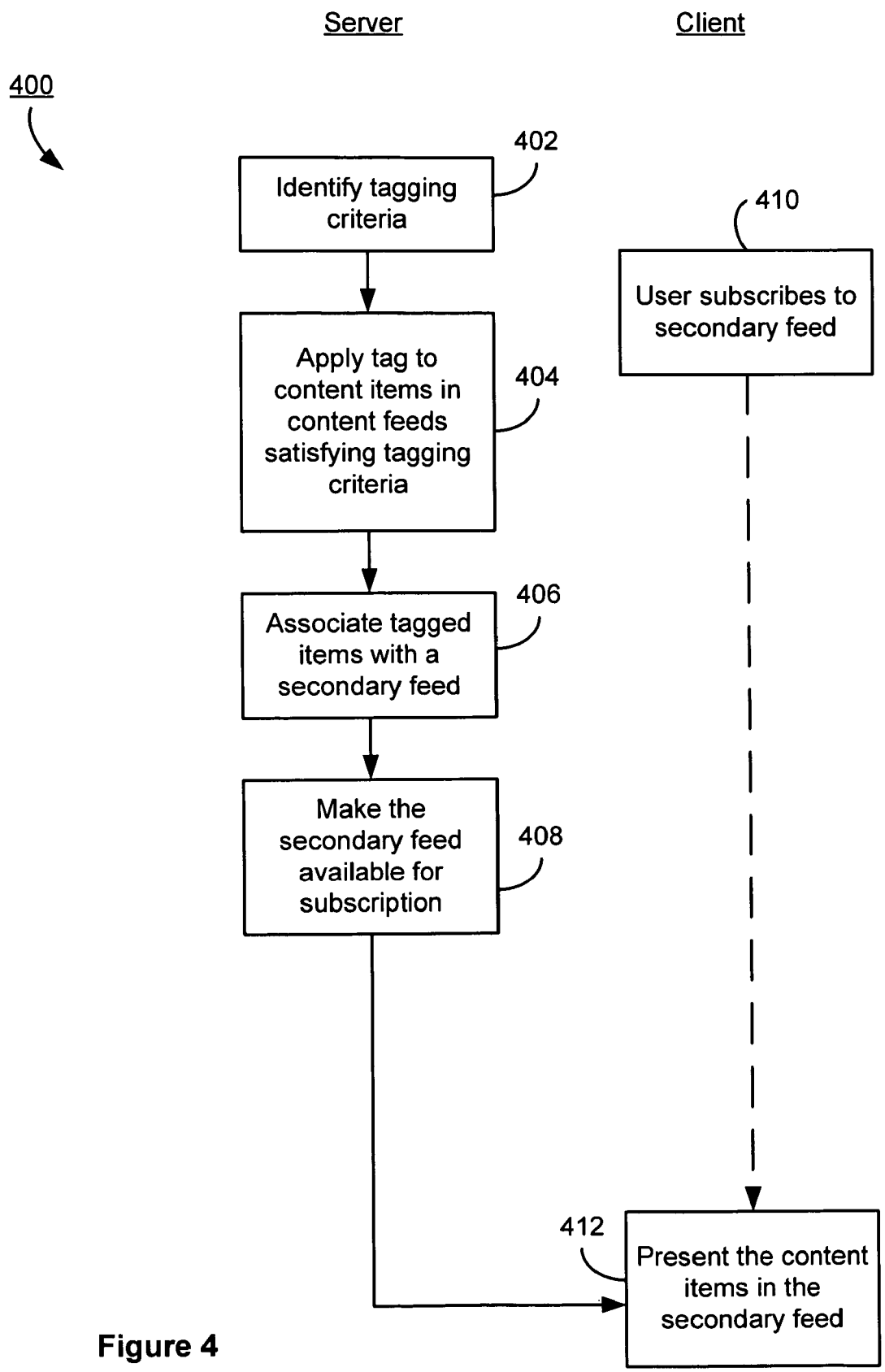
FIG. 4 is a flow diagram illustrating a process for presenting to a user content feeds selected according to predefined criteria, in accordance with some embodiments.

FIG. 4 is a flow diagram illustrating a process for presenting to a user content feeds selected according to predefined criteria, in accordance with some embodiments. In some embodiments, rules, filters, or criteria for tagging content feeds may be predefined. These rules, filters, or criteria may be used to automatically generate secondary feeds to which users may subscribe. For example, a rule may be one for tagging the five most subscribed-to content feeds. This rule would generate a secondary feed that includes content items from the top five content feeds in terms of overall subscriptions. As subscription numbers change, the content feeds in the top five content feeds may change. The list of content items in the tagged content feed changes to reflect changes in the list of top five content feeds.

A tagging criterion, rule, or filter is identified (402). A tag is applied to content items in content feeds satisfying the tagging criteria/rule/filter (404). For example, using the above example of the rule for tagging the top five subscribed feeds, content items in the five most subscribed-to content feeds are tagged. The tagging criteria/rule/filter defines a content feed group that includes the content feeds that satisfies the criteria/rule/filter. The tagged content items are associated with a secondary feed that represents the content feed group defined by the criteria/rule/filter (406), similar to operations 206 (FIG. 2) and 306 (FIG. 2). The secondary feed is made available for subscription by users (408), as in operations 208 (FIG. 2) and 308 (FIG. 3).

A user at a client subscribes to the secondary feed (410). It is noted that subscription operation 410 may occur before or after operations 402-408. The content items in the secondary feed are presented to the user (412). As described above, content items already viewed by the user may be omitted from the presentation.

Just as a user can add or remove tags from content feeds, the same can be done by the predefined tagging criteria, rule, or filter. Taking again the example of the rule which tags the five most subscribed content feeds, the list of the top five subscribed-to content feeds may change over time. As that list changes, content feeds are automatically added and removed from the content feed group. As a result, content items may be added and removed from the secondary feed, similar to the adding and removal of content items from the secondary feed in process 320.

Furthermore, tagging criteria or rules or filters for tagging individual content items from any number of content feeds, similar to a user's tagging of content items from any number of content feeds (as described in relation to process 200), may be created. For example, a rule for tagging content items having a particular keyword may be created. Such a rule may be particularly useful for aggregating content items related to a newsworthy person, place, or event.

As described above, a secondary feed and content items included in the secondary feed may be associated with a tag and with the user who applied the tag. More precisely, the secondary feed may be associated with a user-tag pair. In some embodiments, the content aggregation service may include privacy options that control whether such secondary feeds may be revealed to other users at large (e.g., in a list of available subscriptions) and thus available to other users for subscription, or revealed only to the user with whom the secondary feed is associated. In some embodiments, another privacy setting is to limit visibility of a secondary feed to a set of users selected or approved by the user who created the secondary feed. By setting the privacy options, a user may control the sharing of her tagged content items or content feeds with other users. In some embodiments, the privacy options are set on a per-tag basis. In some embodiments, the default privacy setting for each tag is a maximum privacy setting. As a result, a secondary feed associated with a tag applied by a first user is made available to other users only when the first user has selected less restrictive privacy settings than the default privacy setting.

In some embodiments, the predefined criteria or rules or filters for tagging content feeds or content items may be implemented logically, at the server, as an "imaginary user" tagging content items or content feeds as if it is a real user of the service. That is, an imaginary user representing the criteria/rule/filter is created and associated data is stored at the server. In some embodiments, the privacy options for the imaginary user are always set to share its secondary feed with other users at large. The secondary feed generated as a result of the tagging criteria/rule/filter is associated with the imaginary user. By implementing the tagging criteria/rule/filter as an imaginary user, data in the content aggregation service may share a uniform structure, making data storage more efficient.

By allowing tagging of content items and content feeds and generating secondary feeds from them, the content aggregation service enables indirect subscriptions. A user may tag content items or content feeds of interest to her. A user may subscribe to a secondary feed, whether generated by another user or by a predefined rule for tagging items or feeds, to delegate responsibility of subscribing to content to another user or entity, and/or to get content that may be of interest or noteworthy for some reason (e.g., for being popular in terms of having many subscribers, for being on-topic with regard to a newsworthy person, and so forth).

Figure 5:
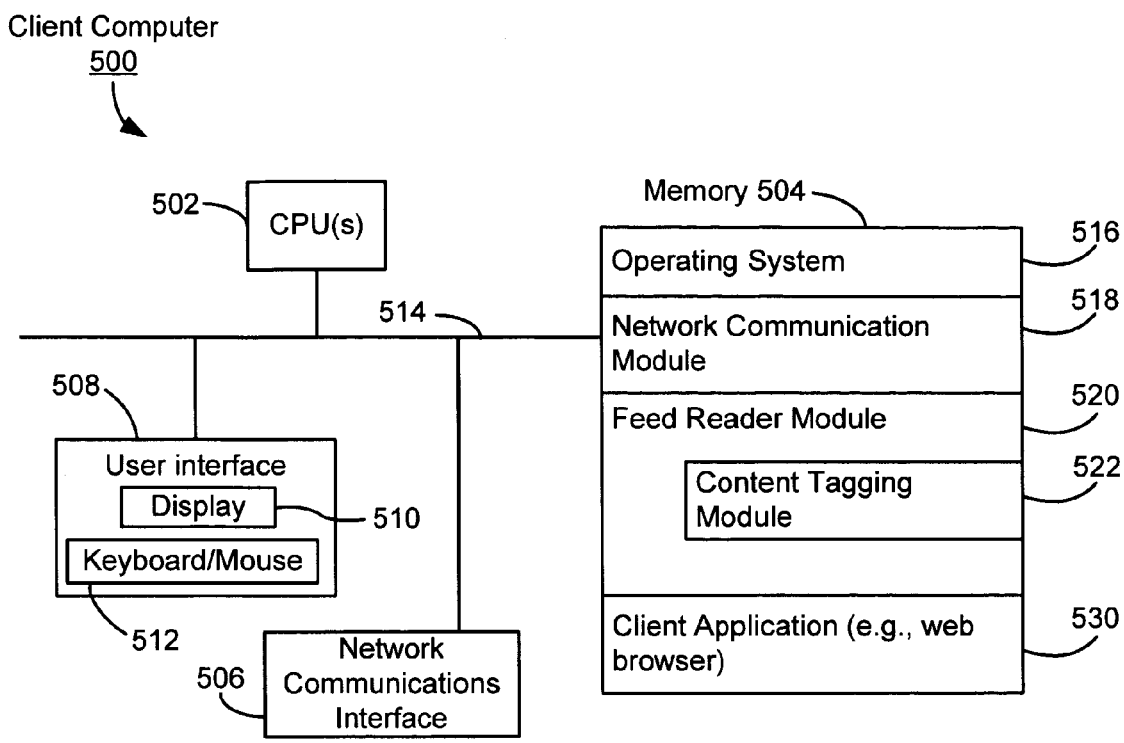
FIG. 5 is a block diagram illustrating a client computer in accordance with some embodiments.

FIG. 5 is a block diagram illustrating a client computer in accordance with some embodiments. The client computer 500 typically includes one or more processing units (CPU's) 502, one or more network or other communications interfaces 506, memory 504, and one or more communication buses 514 for interconnecting these components. The client computer 500 may also include a user interface 508 comprising a display device 510 and a keyboard and/or mouse (or some other pointing device) 512. Memory 504 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 504 may optionally include one or more storage devices remotely located from the CPU(s) 502. In some embodiments, memory 504 stores the following programs, modules and data structures, or a subset thereof:

- an operating system 516 that includes procedures for handling various basic system services and for performing hardware dependent tasks;
- a network communication module 518 that is used for connecting the client system 500 to other computers via the one or more communication network interfaces 506 and one or more communication networks, such as the Internet, other wide area networks, local area networks, metropolitan area networks, and so on; and
- a feed reader module 520 for handling content items from content feeds; and
- a client application 530, such as a web browser.

The feed reader module 520 includes a content tagging module 522 for tagging content items and content feeds in response to user input.

In some embodiments, the feed reader module 520 may be a script-based module, embedded in a web page served from the server system 104 (FIG. 1). The web page may be rendered by a client application 530, such as a web browser, at the client computer 500. When the web page is rendered, the feed reader module 520 is executed, thereby providing a web-based interface to the server system 104. The script-based feed reader module may be written in JavaScript, ECMAScript or any other suitable scripting language.

In some other embodiments, the feed reader module 520 may be a standalone application stored in memory 504 of the client computer 500. The standalone application may include, but is not limited to a feed aggregator application. In further other embodiments, the feed reader module 520 may be an add-on or a plug-in to another application. For, example, the feed reader module 520 may be a plug-in to a web browser application or an email application.

In some embodiments, received content items may be cached locally in memory 504. Similarly, a user's list of content feed subscriptions may also be cached locally in memory 504.

Each of the above identified elements may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 504 may store a subset of the modules and data structures identified above. Furthermore, memory 504 may store additional modules and data structures not described above.

Figure 6:
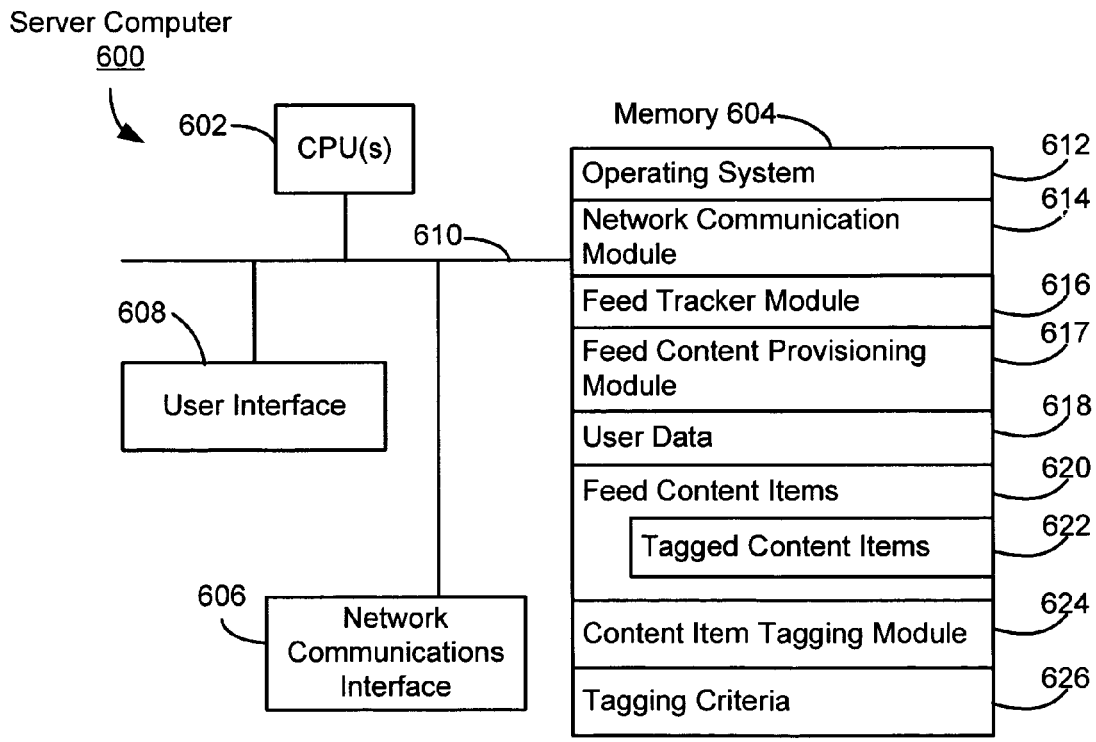
FIG. 6 is a block diagram illustrating a server computer in accordance with some embodiments.

FIG. 6 is a block diagram illustrating a server computer in accordance with some embodiments. The server computer 600 typically includes one or more processing units (CPU's) 602, one or more network or other communications interfaces 606, memory 604, and one or more communication buses 610 for interconnecting these components. The server system 600 optionally may include a user interface 608, which may include a display device (not shown), and a keyboard and/or a mouse (not shown). Memory 604 includes computer-readable storage medium such as high-speed random access memory, such as DRAM, SRAM, DDR RAM or other random access solid state memory devices; and may include computer-readable non-volatile memory, such as one or more magnetic disk storage devices, optical disk storage devices, flash memory devices, or other non-volatile solid state storage devices. Memory 604 may optionally include one or more computer-readable storage devices remotely located from the CPU(s) 602. In some embodiments, memory 604 stores the following programs, modules and data structures, or a subset thereof:

- an operating system 612 that includes procedures for handling various basic system services and for performing hardware dependent tasks;
- a network communication module 614 that is used for connecting the server system 600 to other computers via the one or more communication network interfaces 606 and one or more communication networks, such as the Internet, other wide area networks, local area networks, metropolitan area networks, and so on;
- a feed tracker module 616 for retrieving content items for storage periodically and/or as content feeds are updated;
- a feed content provisioning module 617, for identifying and sending to users content items from the feeds to which they have subscribed;
- user data 618, which includes data for each user of the service;
- feed content items 620, which includes content items from content feeds;
- content item tagging module 624 for tagging content items; and
- tagging criteria 626, which includes criteria, rules, or filters for automatically tagging content items.

The feed content items 620 include content items 622 that are associated with one or more tags. A content item may be associated with one or more tags. In some embodiments, the feed content items 620 may be stored as a database of content items and tags.

The user data 618 includes data for users of the service, such as login information and user preferences. The user data 618 may include subscription lists (not shown), which include lists of users' feed subscriptions. Each user has a corresponding list of content feed subscriptions.

The feed content provisioning module 617 identifies and sends content items to a user in accordance with the user's feed subscriptions. The feed content provisioning module 617 may update the user data 618 to identify content items viewed by the user, so as to avoid sending those same items to the user again. Optionally, for instance in accordance with service features selected by the user, the feed content provisioning module 617 may also update the user data 618 to record other information, such as information identifying content items bookmarked by the user or otherwise marked or selected by the user as being of special interest to the user.

Each of the above identified elements may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 604 may store a subset of the modules and data structures identified above. Furthermore, memory 604 may store additional modules and data structures not described above.

Although FIG. 6 shows a "server computer," FIG. 6 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 6 could be implemented on single servers and single items could be implemented by one or more servers.

Figure 7:
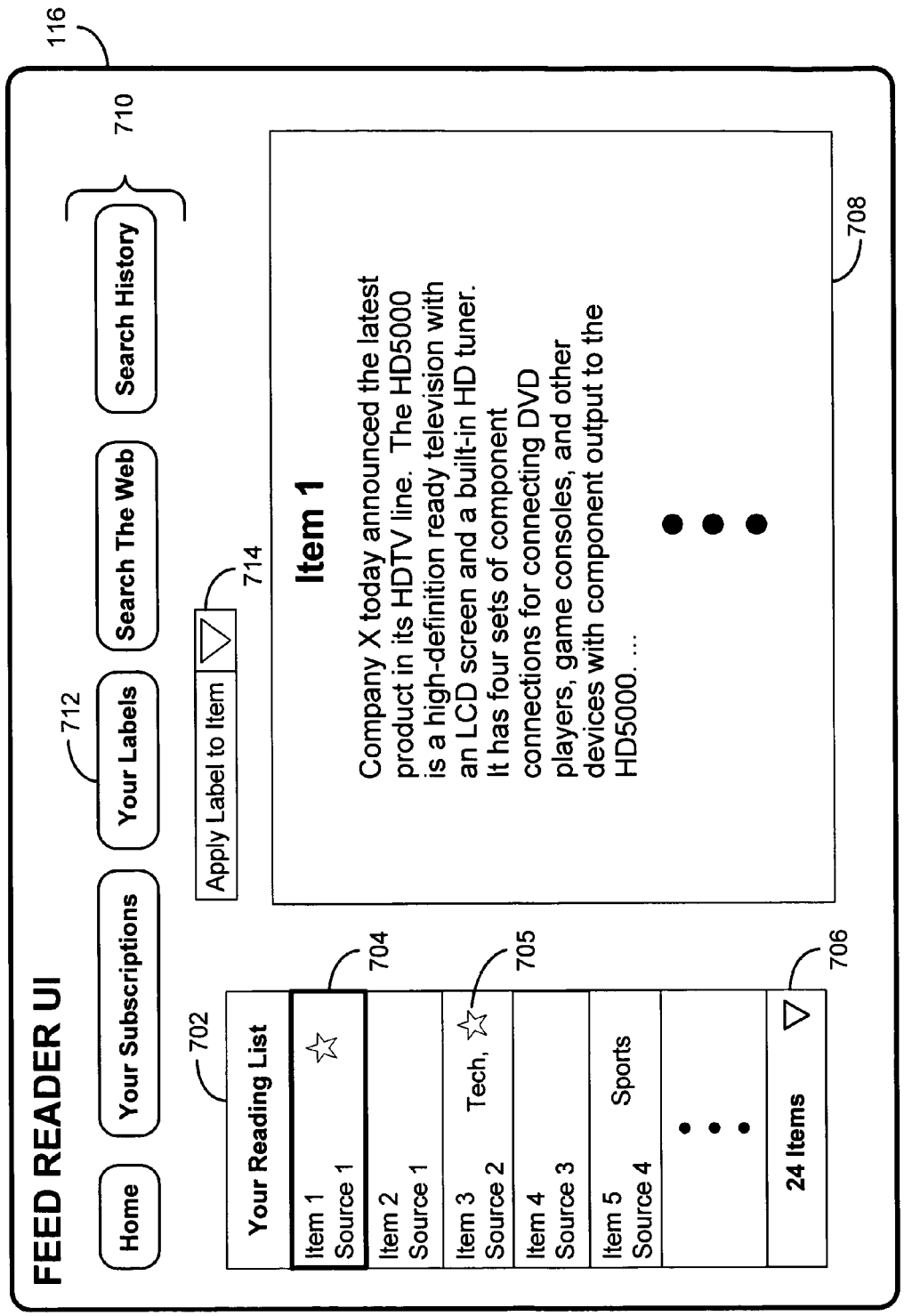
FIG. 7 is a diagram illustrating a feed reader user interface in accordance with some embodiments.

FIG. 7 illustrates a feed reader user interface in accordance with some embodiments. The user, via the feed reader user interface 116, may view, among other things, content items from her subscribed content feeds. The feed reader user interface 116 (hereinafter the "UI") includes one or more buttons, menus, links, and the like 710 for activating and deactivating various functions and features.

The user may view the content items in a "universal view." The universal view includes a list 702 of content items from all of the user's subscribed feeds that have new content items not yet viewed by the user. The list 702 may be generated, for example, by the feed content provisioning module 617 of the server computer 600. In some embodiments, various criteria may be used (by the feed content provisioning module 617) to limit the items included in the list 702, such as publication date and time, and number of items not yet viewed by the user that were published by the same source. For instance, items published more than X (e.g., 7) days ago, may be excluded. In another example, when there are more than Y (e.g., 10) unviewed items from the same source, only the Y most recent unviewed items from the source may be included in the list 702.

The content items 704 shown in the list 702 are interleaved without regard to source. In some embodiments, the list is sorted by publication date and time, for example in reverse chronological order. Also, in some embodiments, the list may show only content items that the user has not viewed. The list presents identifying information for the content items, so that the user can identify a content item she wishes to view and select it. Because the UI 116 may have a finite size and the list may include more items than can fit into the UI, the UI 116 may display a subset of the content items at a given time and the user may scroll through the list to find other content items. The list may also include an indicator 706 of how many content items are in the list in total. Alternatively, the indicator 706 may indicate the number of content items yet to be viewed.

From the list, the user may select a content item. When the user selects an item from the list in the universal view, the UI 116 may display the full version of the content in a viewer region 708. For example, if the selected content item (indicated by a box with a thick border) includes a link to an article at a news web site or a link to a blog posting, the article or the blog posting, respectively, may be displayed in the viewer region 708.

The UI 116 may also include a labels button 712 that the user may select to open a labels page that allows the user to create, view, edit, and remove tags (hereinafter "labels"). The UI 116 may include a pull-down menu 714. The user may use the pull-down menu 714 to apply a label to the currently selected content item.

Figure 8:
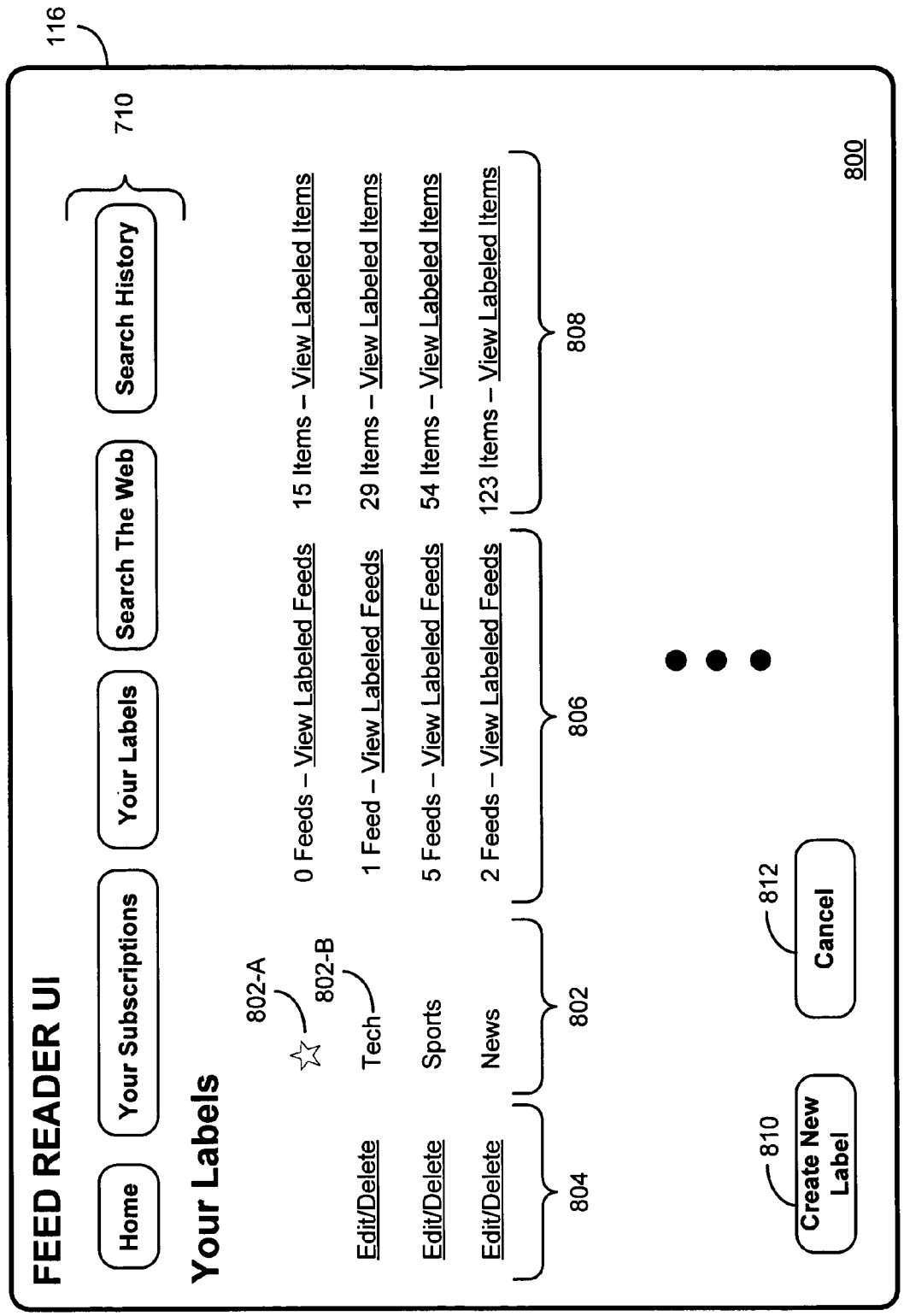
FIG. 8 is a diagram illustrating a labels page in accordance with some embodiments.

FIG. 8 illustrates a labels page in accordance with some embodiments. The labels page 800 includes a list of labels (or "tags") 802. The list of labels 802 may include one or more default, system-defined labels such as a star (or a "favorites" label) 802-A. The list of labels 802 may also include one or more labels created by the user, such as a "Tech" label 802-B. Links 804 to label editing functions are provided for user-defined labels. The user may select a link 804 corresponding to a particular user-defined label to edit or delete that label. A link 804 to label editing functions is not provided for system-defined labels because such labels may not be edited or deleted by the user. The labels page 800 also includes links 806 for viewing content feeds associated with the label (i.e., the content feeds in the content feed group represented by the label) and links 808 for viewing content items associated with the label (i.e., the content items in the secondary feed associated with the label). Also included are: a button 810 the user may select to create a new label, and a cancel button 812 to cancel out of the labels page 800. In some embodiments, a label may be a character string or an icon (or symbol) with a corresponding character string.

Figure 9:
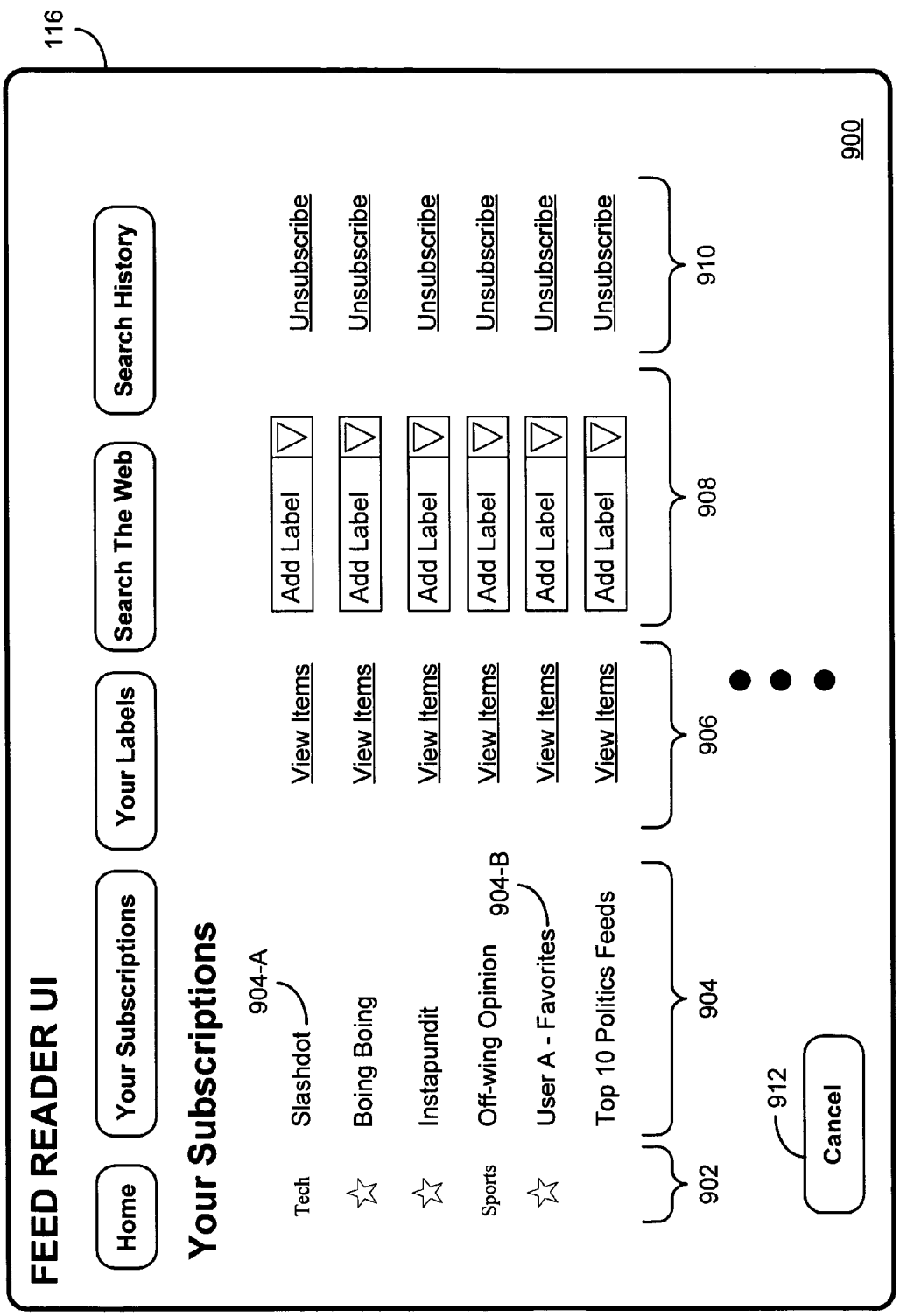
FIG. 9 is a diagram illustrating an active subscriptions page in accordance with some embodiments.

FIG. 9 is a diagram illustrating an active subscriptions page in accordance with some embodiments. The active subscriptions page 900 includes a list 904 of the user's active subscriptions. The active subscriptions 904 includes content feeds to which the user has subscribed, among which may include content feeds (primary feeds) provided by feed sources 120 (FIG. 1), such as content feed 904-A, and secondary feeds, such as secondary feed 904-B. In some embodiments, the name of a secondary feed 904-B associated with a label applied by a real user (as opposed to an imaginary user, as described above) includes a name of the user who "created" the secondary feed (by labeling one or more content feeds and/or content items) and the character string of the label itself. The subscriptions page 900 also includes labels 902, if any, associated with the subscribed-to content feeds 904. Each subscribed-to content feed 904 may have zero or more labels. In some embodiments, even a subscribed-to secondary feed may have zero or more labels.

The subscriptions page may further include links 906 to view content items associated with the corresponding subscribed-to content feed 904, pull-down menus 908 to add labels to the subscribed-to content feeds 904, and links 910 to unsubscribe from any of the subscribed-to content feeds 904. A cancel button 912 may be selected by the user to cancel out of the subscriptions page 900.

Figure 10:
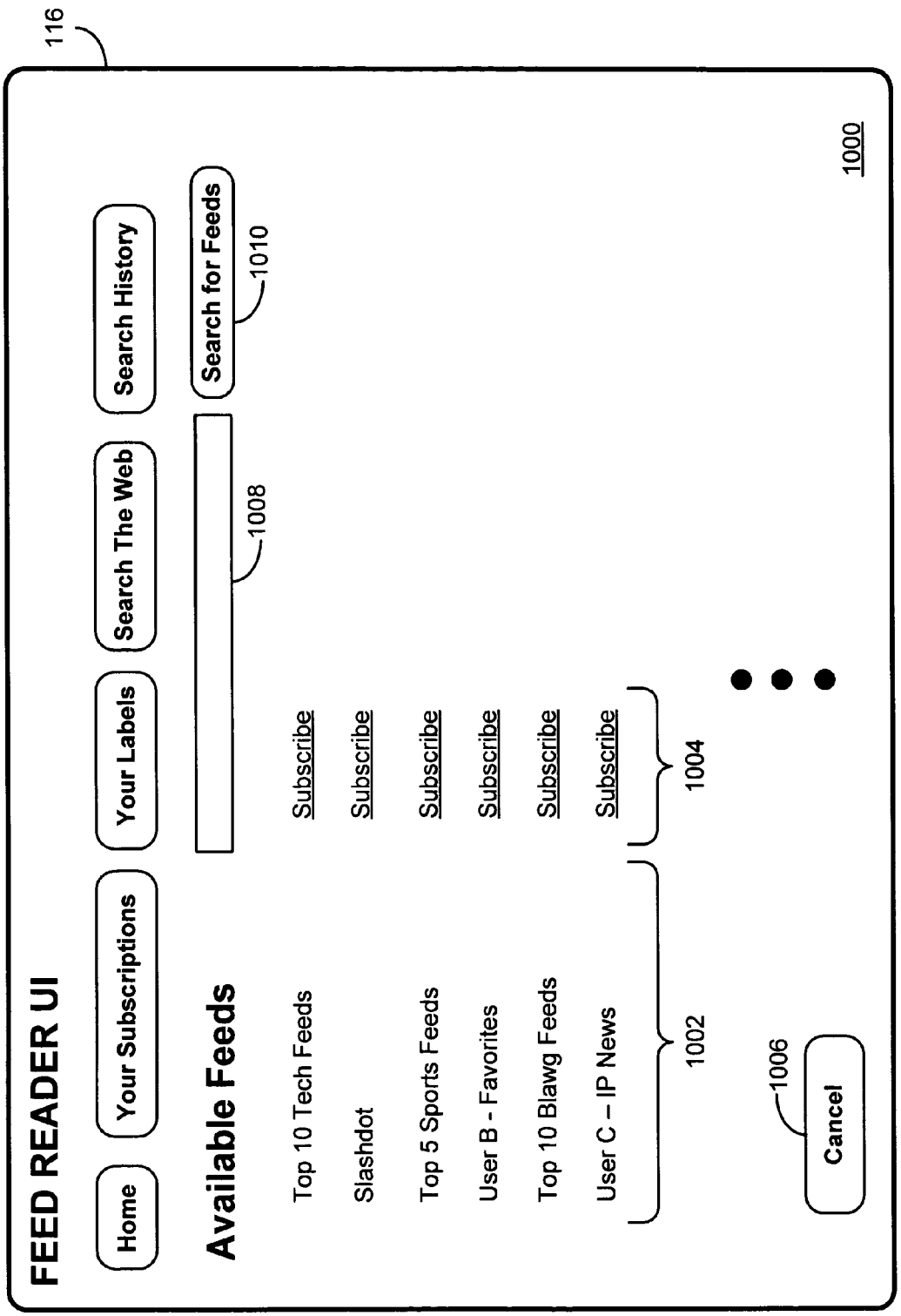
FIG. 10 is a diagram illustrating an available subscriptions page in accordance with some embodiments.

FIG. 10 is a diagram illustrating an available subscriptions page in accordance with some embodiments. The available subscriptions page 1000 lists content feeds to which the user has not subscribed and may subscribe. The available subscriptions page 1000 includes the list of available content feeds 1002 and links 1004 that the user may select to subscribe to the corresponding content feed. The available content feeds in the list 1002 may include any number of content feeds from feed sources 120 (FIG. 1) and any number of secondary feeds. A cancel button 1006 for canceling out of the available subscriptions page 1000 may be included. In some embodiments, a search box 1008 and a search button 1010 may be included. The user may type in one or more keywords or other parameters into the search box 1008 and select the search button 1010 to search for content feeds matching the entered keywords and/or parameters.

Figure 11:
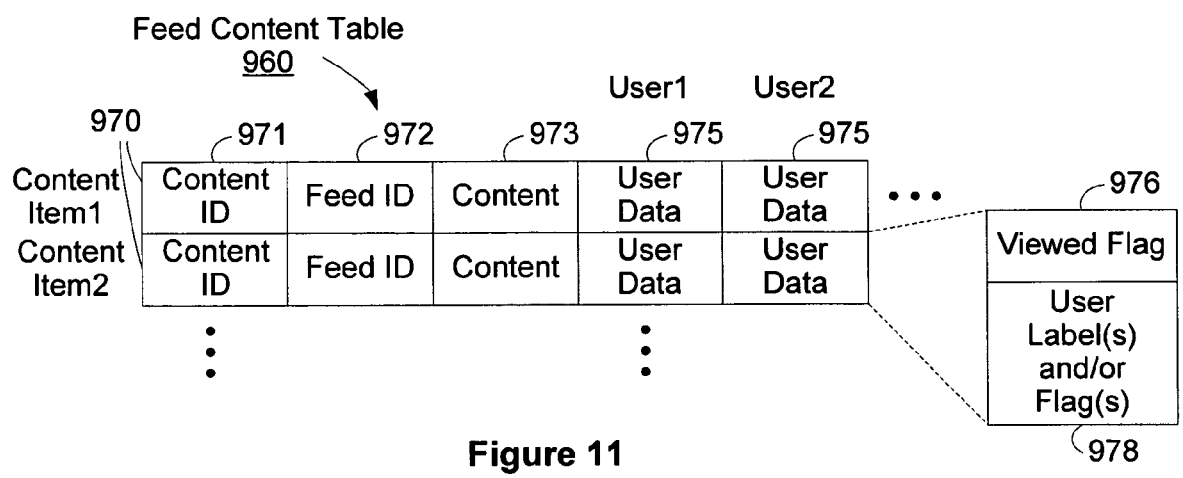
FIG. 11 is a diagram illustrating a data structure for feed content items, in accordance with some embodiments.

FIG. 11 is a diagram illustrating a data structure for feed content items, in accordance with some embodiments. As described above, a server computer 600 (FIG. 6) may store a plurality of feed content items 620. The feed content items may be stored in a data structure, such as a table data structure 960. The feed content items 620 include tagged content items 622 (content items that are each associated with one or more tags) as well as content items not associated with any tag. The feed content table 960 includes a row 970 for each content item from each feed source. Each row includes one or more fields (971, 972) that identify the content item, such as a content ID 971 and a feed ID 972 (which identifies the feed source of the content item). In some embodiments, the content ID may include information that uniquely identifies the feed source, in which case the feed ID 972 may be omitted. Each row 970 may further include content 973 of the content item. The content 973 may include the metadata of the content item (e.g., title, description, URL, date/time, and possibly other metadata), and may further include the actual content of the content item. In addition, each row 970 includes a column 975 or field for each registered user of the system. The user data in this column may include a viewed flag 976, which indicates whether the user corresponding to this column has viewed the content item associated with the row 970 containing the user data and may optionally include additional user information, such as one or more user specified labels or flags 978. A user may tag or label content items, as well as content feeds, and a record of the tag or label that the user associated with each labeled content item is stored in the user data 975. In some embodiments, the system may allow users to tag or label individual content items with predefined tags or labels (e.g., star, red, blue, etc.), and some embodiments further allow users to tag or label individual content items with user-defined labels. Furthermore, a content item, represented by a row 970, may by tagged by any number of users.

As described above, a user may set privacy options to control disclosure (and availability for subscription) of her tagged content items and content feeds to other users at large. In some embodiments, a content aggregation service may be integrated with user address books or contact lists. As a part of the integration, finer privacy options may be made available to the user. The user may use the finer privacy options to control disclosure of tagged content items or feeds to not only other users at large, but also to specific contacts or groups of contacts that are in the user's address book or contact list. This provides for a wider spectrum of disclosure, ranging to full disclosure, limited disclosure to approved contacts, or to no users. In some other embodiments, the content aggregation service may be further integrated with a social networking service that includes profiles of users' interests and affiliations, among other things. The privacy controls may be further adapted to control disclosure of tagged content items or feeds to other users that may share common interests, affiliations, or the like.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of subscribing to content, comprising:
   at a first client:
   subscribing a first user to a content feed group, the content feed group comprising a first set of content feeds and one or more content items tagged by a second user, wherein the one or more tagged content items are selected from at least one content feed that is not in the content feed group;
   concurrently presenting to the first user, in a single view on a user interface, a first plurality of content items from the content feed group, including a plurality of respective content items from the first set of content feeds and a respective content item of the one or more content items tagged by the second user that were selected from the at least one content feed that is not in the content feed group; and
   after a tagging change to the content feed group made by the second user at a second client, concurrently presenting to the first user a second plurality of content items from the changed content feed group in accordance with the tagging change.

2. The method of claim 1, wherein the first plurality of content items comprises content items from two or more of the first set of content feeds.

3. The method of claim 1, wherein presenting the second plurality of content items comprises presenting a plurality of respective content items included in a changed set of content feeds of the changed content feed group.

4. The method of claim 1, wherein the tagging change to the content feed group made by the second user comprises adding to the content feed group one or more different content items from at least one content feed that is not in the content feed group.

5. The method of claim 1, wherein:
   the tagging change comprises addition of a new content item to the content feed group; and
   the second plurality of content items presented to the first user includes the new content item.

6. The method of claim 1, wherein:
   the tagging change comprises removing a tag from a respective content item from the content feed group; and
   the second plurality of content items presented to the first user excludes the respective content item excluded by the tagging change.

7. The method of claim 1, wherein the content feed group further comprises one or more content items tagged automatically in accordance with a rule, wherein the one or more content items tagged automatically in accordance with the rule are selected from at least one content feed that is not in the content feed group.

8. A client system for subscribing to content, comprising:
   memory;
   one or more processors; and
   one or more modules stored in the memory and configured for execution by the one or more processors, the modules including instructions:
   to subscribe a first user to a content feed group, the content feed group comprising a first set of content feeds and one or more content items tagged by a second user, wherein the one or more tagged content items are selected from at least one content feed that is not in the content feed group;
   to concurrently present to the first user, in a single view on a user interface, a first plurality of content items from the content feed group, including a plurality of respective content items from the first set of content feeds and a respective content item of the one or more content items tagged by the second user that were selected from the at least one content feed that is not in the content feed group;
   after a tagging change to the content feed group made by the second user at a second client, to concurrently present to the first user a second plurality of content items from the changed content feed group in accordance with the tagging change.

9. The system of claim 8, wherein the first plurality of content items include content items from two of more of the first set of content feeds.

10. The system of claim 8, including instructions to present a plurality of respective content items included in a changed set of content feeds of the changed content feed group.

11. The system of claim 8, wherein the change to the content feed group comprises adding to the content feed group one or more different content items from at least one content feed that is not in the content feed group.

12. The system of claim 8, wherein:
    the tagging change comprises removing a tag from a respective content item from the content feed group; and
    the second plurality of content items presented to the first user excludes the respective content item excluded by the tagging change.

13. The system of claim 8, wherein the content feed group further comprises one or more content items tagged automatically in accordance with a rule, wherein the one or more content items tagged automatically in accordance with the rule are selected from at least one content feed that is not in the content feed group.

14. A computer readable storage medium storing one or more programs, the one or more programs comprising instructions for:

subscribing a first user to a content feed group, the content feed group comprising a first set of content feeds and one or more content items tagged by a second user, wherein the one or more tagged content items are selected from at least one content feed that is not in the content feed group;

presenting to the first user, in a single view on a user interface, a first plurality of content items from the content feed group, including a plurality of respective content items from the first set of content feeds and a respective content item of the one or more content items tagged by the second user that were selected from the at least one content feed that is not in the content feed group; and after a tagging change to the content feed group made by the second user at a second client, wherein the change comprises adding to the content feed group one or more different content items from at least one content feed that is not in the content feed group, presenting to the user a second plurality of content items from the changed content feed group in accordance with the tagging change.

15. The computer readable storage medium of claim 14, wherein presenting the first plurality of content items comprises presenting a plurality of respective content items included in the set of content feeds of the content feed group wherein the first plurality of content items include content items from two of more of the first set of content feeds.

16. The computer readable storage medium of claim 14, wherein presenting the second plurality of content items comprises presenting a plurality of respective content items included in a changed set of content feeds of the changed content feed group.

17. The computer readable storage medium of claim 14, wherein the change to the content feed group comprises adding to the content feed group one or more different content items from at least one content feed that is not in the content feed group.

18. The computer readable storage medium of claim 14, wherein:

the tagging change comprises removing a tag from a respective content item from the content feed group; and the second plurality of content items presented to the first user excludes the respective content item excluded by the tagging change.

19. The computer readable storage medium of claim 14, wherein the content feed group further comprises one or more content items tagged automatically in accordance with a rule, wherein the one or more content items tagged automatically in accordance with the rule are selected from at least one content feed that is not in the content feed group.

20. A client system for subscribing to content, comprising:

means for subscribing a first user to a content feed group, the content feed group comprising a first set of content feeds and one or more content items tagged by a second user, wherein the one or more tagged content items are selected from at least one content feed that is not in the content feed group;

means for concurrently presenting to the first user, in a single view on a user interface, a first plurality of content items from the content feed group, including a plurality of respective content items from the first set of content feeds and a respective content item of the one or more content items tagged by the second user that were selected from the at least one content feed that is not in the content feed group; and means for, after a tagging change to the content feed group made by the second user at a second client, concurrently presenting to the first user a second plurality of content items in accordance with the changed content feed group.

21. The client system of claim 20, wherein the change to the content feed group comprises addition to the content feed group of one or more different content items from at least one content feed that is not in the content feed group.

* * * * *